March 10, 1970     J. R. SCHNEIDER     3,499,532
LIQUID FILTERING DEVICE

Filed May 9, 1966     5 Sheets-Sheet 1

INVENTOR.
JOHN R. SCHNEIDER
BY *Joseph F. Cole*
ATTORNEY

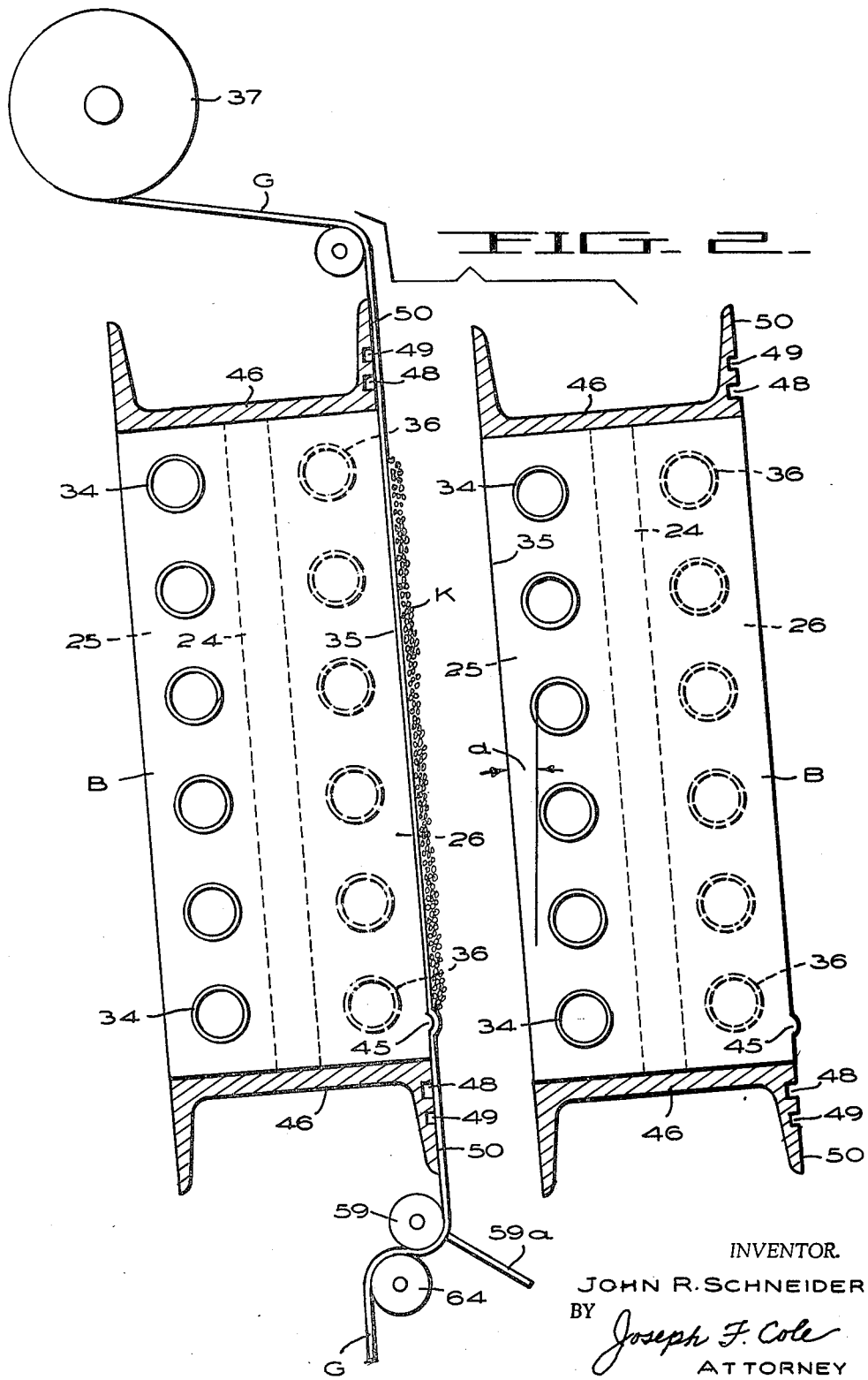

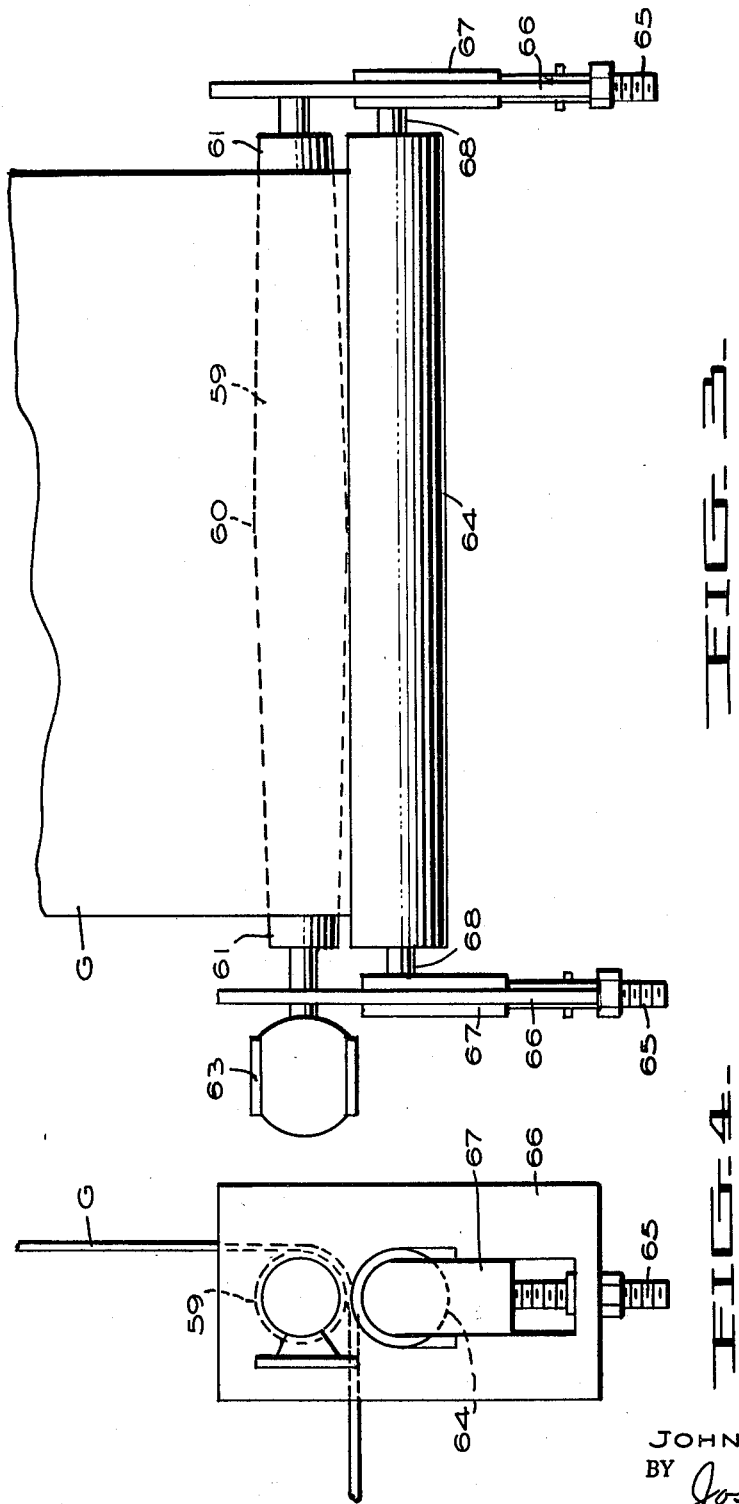

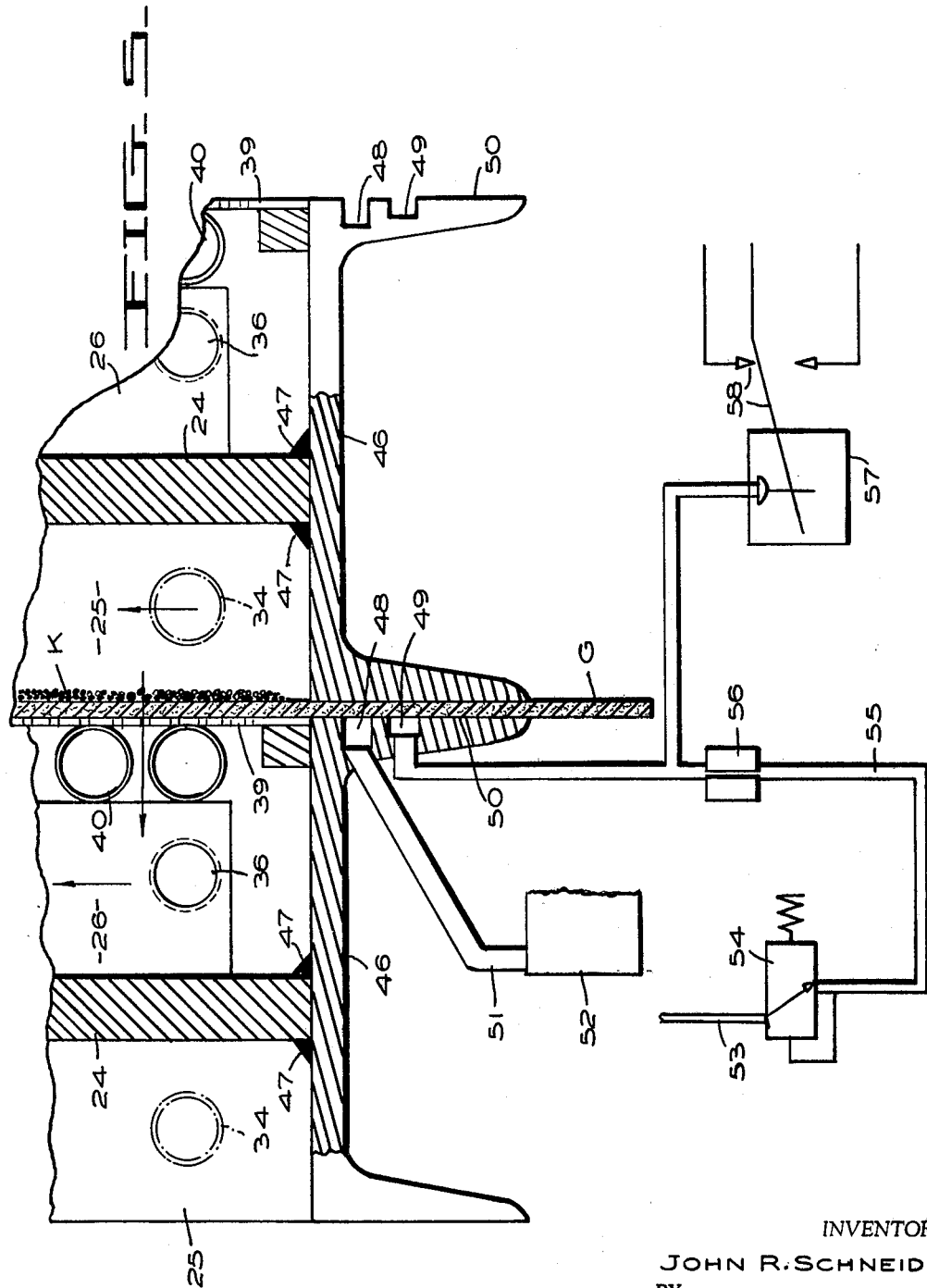

March 10, 1970     J. R. SCHNEIDER     3,499,532
LIQUID FILTERING DEVICE

Filed May 9, 1966                          5 Sheets-Sheet 5

INVENTOR.
JOHN R. SCHNEIDER
BY Joseph F. Cole
ATTORNEY

United States Patent Office

3,499,532
Patented Mar. 10, 1970

3,499,532
LIQUID FILTERING DEVICE
John R. Schneider, P.O. Box 426, Belvedere-
Tiburon, Calif. 94920
Filed May 9, 1966, Ser. No. 548,747
Int. Cl. B01d 25/32, 29/36, 37/02
U.S. Cl. 210—138                    9 Claims

ABSTRACT OF THE DISCLOSURE

A liquid filtering device in which accumulated foreign matter is removed from a filter cake support medium on completion of the total operating time (either continuous or interrupted) of an adjustable set time period of a time switch, during which time a predetermined amount of aids to filtration are delivered to the filtering device, this amount being controlled by a percentage timer. Upon completion of this total operating time, automatic control means initiates an automatic cycle of operation, which disposes of the foreign material built up on the cake support medium and, also, automatically replaces the dirty cake support medium with a clean one for the next filter cycle. The cake support medium is held between adjacent separable liquid containers, and an arrangement is provided for preventing the filter cake from falling out of the filter area between the separated containers, and thus preventing the seal faces of the containers from being contaminated, and permitting these seal faces to be moved back into liquid-tight relation with one another. Moreover, a safety arrangement is provided to prevent a filter pump from starting up, causing excessive leakage, if the containers are not properly sealed together.

---

The present invention relates to improvements in a liquid filtering device and more particularly to the plate-type filter, sometimes referred to as a plate and a frame-type filter. The plate filter does an exceptionally good job of filtering, i.e., the removal of suspended particles from a liquid. However, the manual problem of cleaning this type of filter is an extremely laborious task, generally requiring two men anywhere from one hour to three hours or more to complete the task of cleaning the filter and getting it back "on stream."

My invention eliminates this manual laborious task of cleaning this type of filter by doing it automatically by novel control means, with no personnel required to be present while the cleaning operation is taking place.

One object of my invention is to provide an improved liquid filtering device in which accumulated foreign material is removed from a filter cake support medium (usually a screen or a disposable filter fabric that will support a filter cake), on the completion of the total operating time (either continuous or interrupted) of an adjustable set time period during which time a predetermined amount or quantity of aids to filtration are delivered to the filtering device. Upon completion of the total operating time, automatic control means initiates an automatic cycle of operation which in turn automatically disposes of the removed foreign materials built up on the cake support medium and, also, automatically replaces the dirty cake support medium with clean cake support medium for the next filter cycle. The signal for the cleaning cycle is received from a time switch and a percentage timer is connected to a feed valve of the body feed device that supplies the aids to filtration to the filter. The time between cleaning cycles is automatically controlled in relationship to the amount of time in which filter aids and adsorbents are fed to the filtering system.

Another object of my invention is to provide a liquid filtering device wherein the cake support medium is held between two separable liquid containers arranged side by side, which are automatically separated to allow the movement of the dirty cake support medium and removal of foreign materials accumulated on the cake, and move a new clean support medium into the liquid container area between the two separated liquid containers.

Another object of the invention is to provide an automatically operated filter cake support feeding device for indexing this medium, while at the same time maintaining proper tracking of the cake support medium so that it will stay centered and not move over to one side or the other to the extent of becoming misaligned with seal faces of a separated filter liquid containers.

Another object of the invention is to provide arrangement of preventing the filter cake, made up of filter aids and foreign materials removed from the liquid by the filtration process, from falling out of the filter area between the two separable liquid containers when the latter are separated, which would contaminate the seal faces of the separable liquid containers and make it impossible for them to seal properly when pressed back together again.

Another object of the invention is to provide an arrangement to prevent the cake from sliding down to the bottom of the containers when the pressure due to the velocity of the liquid passing through the cake is removed.

Another object of the invention is to provide an arrangement for sealing the faces of the separable liquid containers to prevent leakage of the liquid to a position outside of these containers to the extent of dripping on the floor.

Another object of the invention is to provide a safety arrangement to prevent the filter pump from starting up, causing excessive leakage, if the faces of the separable liquid containers are not properly sealed for any reason whatsoever.

Other objects and advantages will appear as the specification proceeds, and the novel features of the invention will be particularly set forth in the appended claims.

DRAWINGS

For a better understanding of the invention reference should be had to the accompanying drawings, forming part of this specification, in which:

FIG. 2 is an elevational view illustrating two of the separable liquid containers spaced from one another and both being arranged on a bias or incline, and further showing the path of the filter cake support medium when indexing between the spaced containers;

FIG. 3 is a transverse elevational view showing a crowned roll for the proper tracking of the filter cake support medium, including adjusting screws for tracking adjustment;

FIG. 4 is an end elevational view of FIG. 3;

FIG. 5 is a detailed view, partly in section, disclosing the arrangement for sealing the faces of the separable liquid containers, and including a safety device to prevent the pump motor from starting, if no seal pressure is present between these containers.

While I have shown only the preferred embodiment of my invention, it should be understood that various changes, or modifications, may be made without departing from the spirit thereof.

DETAILED DESCRIPTION

Figure 1:
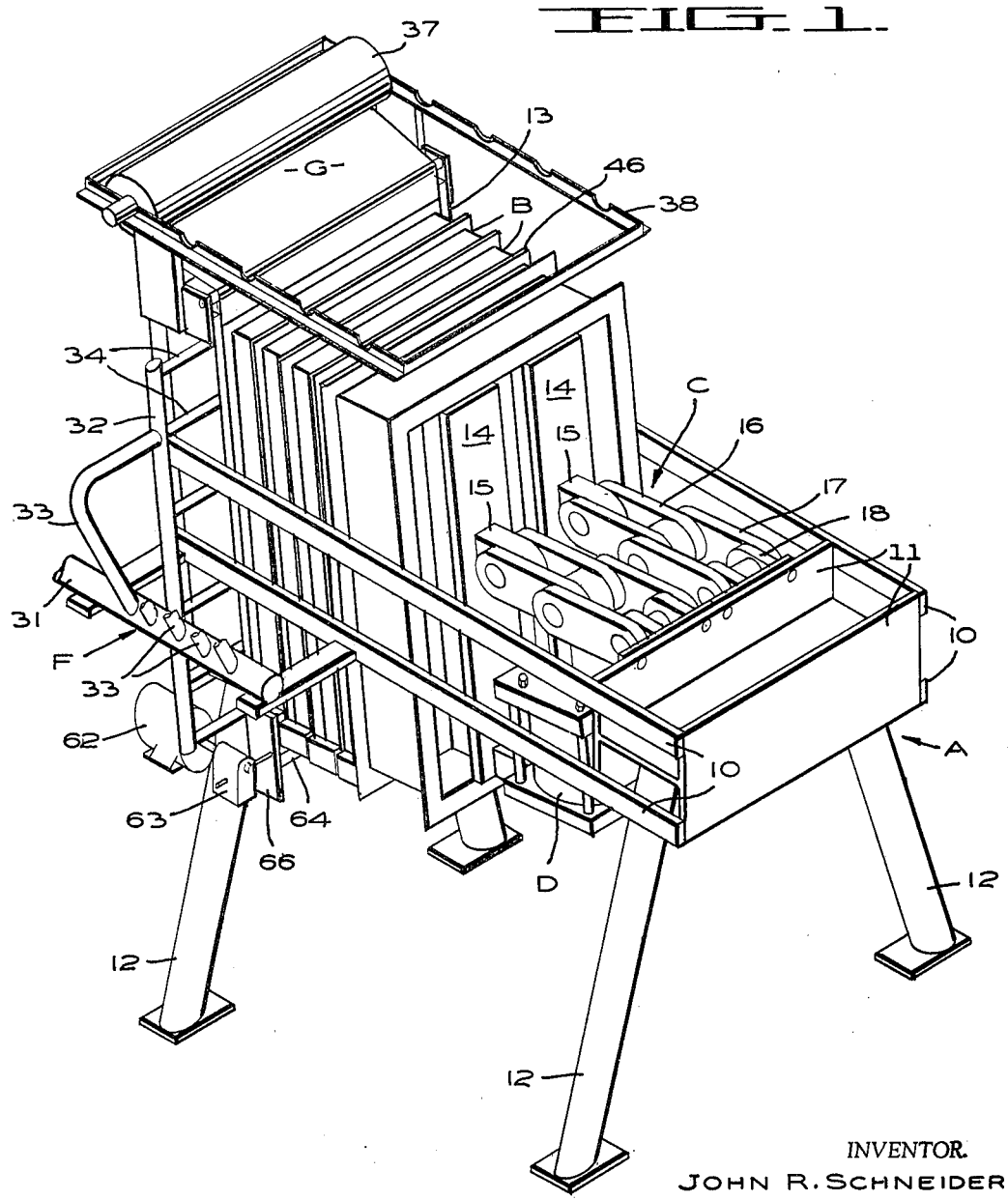
FIG. 1 is an isometric view of my liquid filtering device.

Referring now to the drawings in detail, there has been disclosed a supporting frame designated generally at A in FIG. 1, defining longitudinal side bars 10 that are interconnected by transverse plates 11, and legs 12 may be provided on this frame. It will be noted that a plurality of separate liquid containers B are arranged for support by the frame A and are disposed in bank formation one behind the other. Particular attention is called to the fact that all of these containers are disposed on a bias or inclined relative to vertical at an angle $a$ (see FIG. 2), rather than straight up and down or horizontally, as is normal in many types of liquid filters today.

As illustrated in FIG. 1, a back-up plate 13 is provided at the rear of the frame A and against which the rearmost container in the bank may be pressed by a toggle arrangement C, with adjacent containers being pressed into face to face contact with each other.

The toggle arrangement C has press plates 14 that bear against the forward liquid container B in the bank, and these press plates have brackets 15 secured thereto which a rear group of links 16 of the toggle arrangement are swingably secured. Moreover, a front group of links 17 are swingably connected to one of the transverse plates 11 by brackets 18. The adjacent ends of the links 16 and 17 overlap each other and are swingably secured together as clearly shown in FIGS. 1 and 6.

Figure 6:
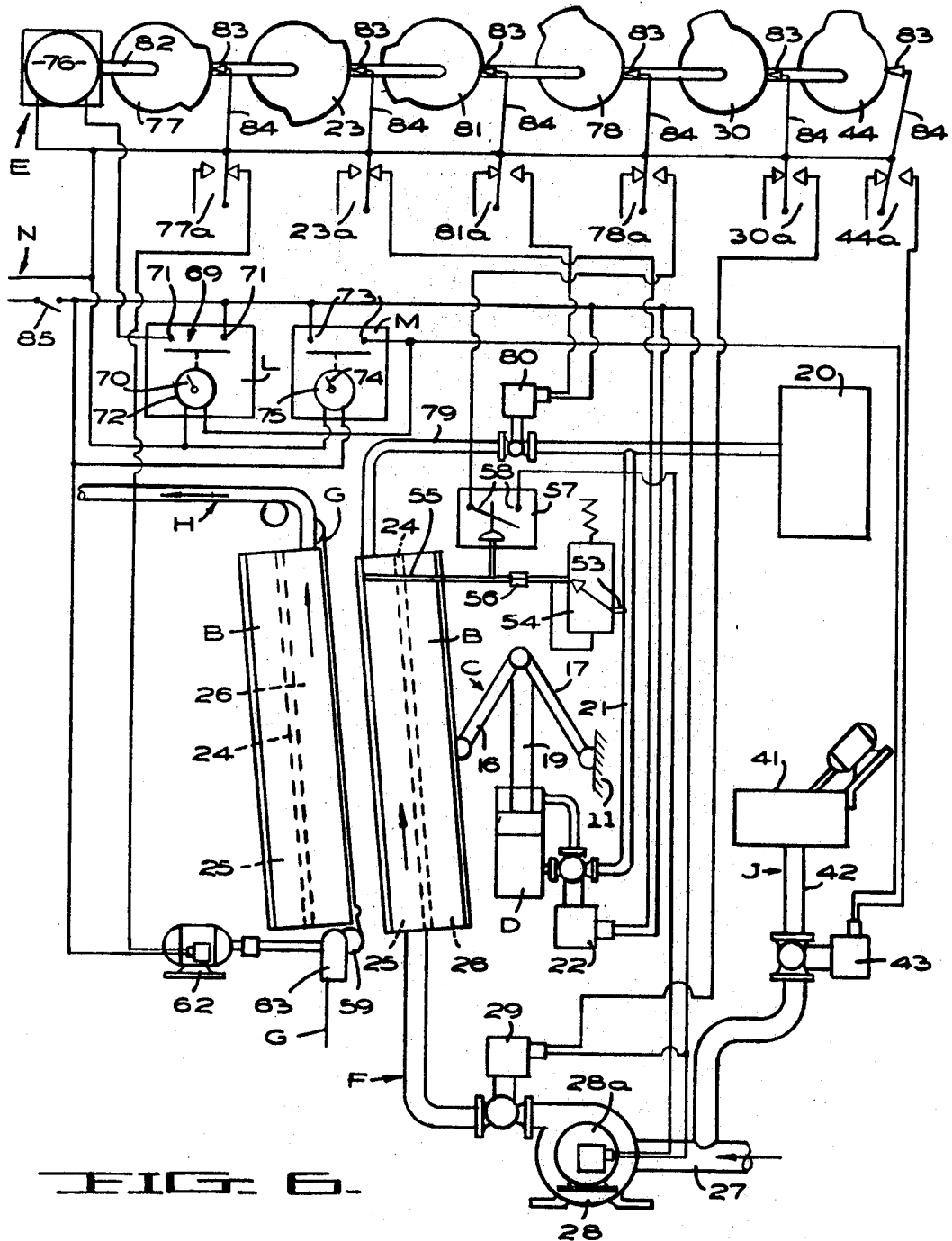
FIG. 6 is a liquid and electrical diagram showing the various automatic functions of my liquid filtering device.

For the purpose of operating the toggle arrangement C, a ram D has been provided, and preferably two of these rams are utilized. The ram or rams may be pneumatic or hydraulic, and FIG. 6 shows the ram as having a piston rod 19 as being attached to the adjacent ends of the toggle links 16 and 17. As the rod 19 is pulled downwardly, the toggle arrangement will be expanded so as to urge the bank of containers B toward the back-up plate 13. Air may be supplied to this ram from a tank 20 by means of a pipe 21 in which a solenoid valve 22 is coupled, this valve being opened and closed under control of a cam 23 and associated cam switch 23a forming part of a motor-driven cam switch designated generally at E. The construction and operation of the latter will be set forth more fully as the specification continues.

Each of the separable liquid containers B is provided with an upwardly-extending partition 24 on its interior that divides the container into inlet ad outlet chambers 25 and 26, respectively. It will be apparent from FIGS. 2, 5 and 6 that the inlet chamber 25 of each liquid container faces and is disposed adjacent to the outlet chamber 26 of the next container arranged therebehind in the bank of containers.

The liquid to be filtered flows through a inlet pipe 27 to a pump 28, and the liquid discharged by this pump passes through a solenoid valve 29 when the latter is opened under the control of a cam 30 and its associated cam switch 30a forming part of the motor-driven cam switch E previously mentioned. The pumped liquid flows to an inlet manifold F (see FIGS. 1 and 6). As disclosed in FIG. 1, this manifold defines a horizontal pipe 31 that is coupled to a vertical header pipe 32 by a flexible hose 33. Branch inlet pipes 34 lead from this header pipe to the inlet chambers 25 of the several containers B so as to deliver pumped liquid thereto.

It will be observed from FIGS. 1, 2, 5 and 6 that a cake support medium G, for instance, a screen or a disposable fabric, passes downwardly between the confronting faces 35 of each adjacent pair of liquid containers B so as to form a porous cover over the outlet chamber 26 of each container B. Thus, all liquid flowing from the inlet chamber 25 of one container to the outlet chamber 26 of the adjacent container therebehind must pass through this cake support medium G before flowing through outlet pipes 36 of an outlet manifold H (see FIG. 6). As a convenient mode for feeding the cake support medium G to positions between the separated containers B, such medium may be in the form of sheets extendable from rolls 37 that are supported by an overhead frame 38 (see FIG. 1).

For the purpose of giving adequate support to the cake support medium G and preventing the latter from being ruptured by the pressure of the liquid being forced therethrough, the outlet chamber 26 of each separable liquid container B is provided with a perforated backup plate 39, and this plate is given further support by transverse tubes 40. The cake support medium G and the perforated plate 39 cover the entire inlet face of the outlet chambers 26 (see FIG. 5).

Aids to filtration are delivered by a body feed device J to the inlet pipe 27 for mixing with the liquid passing through the latter to the pump 28 and finally being delivered to the separable containers B at the inlet chambers 25 of the latter (see FIG. 6). This body feed device has been disclosed as having a receptacle 41 for storage of the aids to filtration, and outflow of the latter to the inlet pipe 27 through a pipe 42 leading from the receptacle 41 is controlled by a solenoid valve 43 coupled into this pipe 42. Solenoid valve 43 is opened and closed under control of contacts 73 of a percentage timer M, as hereinafter described; however, during the automatic cleaning operation power to this valve is removed, because cam 44 of motor-driven cam switch E has opened its associated cam switch contacts 44a. These operations will be described more in detail as the specification continues.

As illustrated in FIGS. 2 and 5, a cake K is formed on the cake support medium G overlying the outlet chamber 26 of each separable liquid container B. Inasmuch as these containers are installed in the supporting frame A on a bias or incline relative to the vertical, this structural feature will prevent the dry cake K from tumbling down when the containers are separated for cleaning and cake removal. In the plate-type filters now on the market, because the plates are installed straight up and down, some of the cake falls down and is deposited on the seal faces of the plates as the latter are separated.

In a manual cleaning operation, this is no problem because the workmen can clean these seal faces before they press the plates back together. However, in a totally automatic cleaning operation with no workmen present, the seal faces must stay free of any filter cake material, or else the filter plates will not seal properly and will leak prohibitively. Thus, installing the containers B on a bias to the earth gravitational pull, as in my invention, solves this problem.

In order to make the cake K stay in place when filtering stops and the containers B are separated, as in FIG. 2, a step 45 is provided at the bottom of the cake space to support the cake and preventing the latter from sliding downwardly (see FIG. 2). This step gives the cake column support so that it will not slide downwardly when pressure on the cake K is removed.

Another feature of my liquid filtering device is the manner in which the faces of the containers B are sealed to prevent leakage from the inside of the filter from leaking out to the atmosphere due to the pressure inside the filter chambers, or due to capillary action of the cake support medium G. The conventional method used today to seal the plates from leakage is an O ring; or in some cases, a vacuum groove is cut in the face of the seal area. Vacuum is maintained on this groove so any leakage outward from the filter pressure area goes into this groove and can be piped away.

As shown in FIGS. 1, 2 and 5, each container B has a shell member 46 extending entirely therearound, and this member has been shown as being made from channels. The partitions 24 are welded at 47 to the shell members 46 (see FIG. 5). In my liquid filtering device I provide a pair of grooves 48 and 49 in the seal face 50 of each shell member 46 that extend around the entire perimeter of the shell member in parallel relation with one another (see FIGS. 2 and 5).

The innermost groove 48, i.e., the groove closest to the inside of the filter container B, communicates by a pipe 51 to an open tank 52 and is under atmospheric pressure. The outermost groove 49, i.e., the one remote from the inside of the filter container B, has air pressure therein, for example five pounds per square inch greater than atmospheric, or other suitable pressure. The air for this groove is supplied by a pipe 53 that communicates with an air regulator 54, and the latter delivers air through a pipe 55 to the outer groove 49 (see FIG. 5). The pipe 55 is provided with an adjustable orifice 56 therein to regulate the air pressure reaching the groove 49.

The air pressure in the outer groove 49 leaks to the inner groove 48 through the edge of the cake support medium G, and goes to atmosphere with any liquid that has been leaked from the inside of the filter container B into the inner groove 48. The amount of liquid leakage from the filter container in an outward direction and the amount of air leakage from the outer groove 49 in an inward direction are very small, since the liquid containers B are pressed together by the toggle arrangement C with a pressure of about one hundred tons. The liquid leakage generally is by capillary action; however, it is great enough that if it were allowed to come out and drip on the floor, it would be objectionable. In my filtering device, this leakage is piped to the tank 52.

Another important structural feature of my invention is the safety measures taken to prevent the filtering device from automatically going "on stream" in the event that the containers B are not properly sealed against leakage due to running out of cake support medium G or other causes. In a manually-cleaned filter, if the filter leaks due to poor sealing, the workmen can see the leak and shut down the pump and reseal the filter plates. In an automatic filtering device, no workmen are present when the filter is cleaned and goes "on stream," so some protective device is necessary to prevent the filter from going "on stream," if the plates are not properly sealed against leakage.

In my liquid filtering device, the air supply to the outer groove 49 is metered through the adjustable orifice 56 previously mentioned, and just enough air is allowed to flow through this orifice to build up a few pounds of pressure in the air-seal groove 49 when the separable liquid containers B are properly sealed against one another. If the filtering device has run out of cake support medium G, or if the seal on the faces of the shell members 46 has not made up properly for any reason, no air pressure will build up in the outer groove 49 because the air will escape through the poorly sealed area as fast as it can get through the orifice 56. If there is no pressure build up in the groove 49, the filter pump 28 will not start as there is a pressure switch 57 in the pump motor start circuit that closes its contacts only when there is air pressure in the groove 49.

In FIG. 6, the air pipe 53 has been shown as branching from the pipe 21 that leads from the tank 20 of compressed air. Also, this view shows the air regulator 54, adjustable orifice 56 and pressure switch 57.

Another structural feature of my liquid filtering device is a crown roll 59 used to make the cake support medium G track properly while indexing, as shown in FIGS. 2, 3, 4 and 6. As disclosed in FIG. 3, this crown roll tapers from its center 60 towards its opposite ends 61. The crown roll is rotated by a motor 62 and a gear reduction unit 63 (see FIGS. 1 and 6), and it coacts with a pinch roll 64 in removing a used section of the cake support medium G from between adjacent containers B and bringing a new section into operative position, and scraper 59a removes the old cake from the cake support medium.

In the event that the cake support medium G should tend to move to one side or the other to the extent of becoming misaligned with the seal faces of the separated liquid containers B, bolts 65 may be adjusted to raise one end or the other of the pinch roll 64 (see FIGS. 3 and 4). These bolts are adjustably carried in slotted brackets 66 and are operably to raise or lower slides 67 in which the shaft 68 of the pinch roll 64 is journalled. It is absolutely necessary that the cake support medium G stay centered on the face of the container B or improper sealing will result. By crowning the drive roll 59, this medium will track properly and stay centered.

Another feature of my invention is the manner in which I initiate the automatic cleaning cycle. It is especially advantageous when applied to a filter used to keep the roll coolant clean in the metal rolling process.

In most all continuous filtration systems, the dirt load fed into the system is relatively constant for each mill or system; however, the degree of cleanliness required can be quite different for various mills or systems. For example, a rolling mill used to roll finished aluminum foil stock (.00025" gauge thickness) must have a much higher degree of coolant cleanliness than a mill used to roll "first pass," or as referred in the art as "breakdown passes." The coolant used for finished passes should have a total ash content (a gauge of coolant cleanliness) of around .002% total ash. However, the total ash content requirement of a coolant for breakdown passes can be as high as .08% total ash. Also, the amount of filter aids and adsorbent continuously fed into a coolant filter per hour regulates the degree of cleanliness or total ash content of the coolant, so it is therefore important to have some means of controlling the total amount of filter aids and adsorbents fed into a filter per hour to give the mill operator a choice of cleanliness.

For example: If a mill is being used for breakdown passes, the operator can use a coolant with an ash content of around .08% total ash. This degree of ash content might be continuously maintained with the use of 100 pounds of filter aids and adsorbents per hour. If the particular filter used on the subject mill has a total holding capacity of only 100 pounds of filter aids and adsorbents, it will be required that the filter must go through a cleaning cycle each hour, or the filter will become packed with filter aids and adsorbents beyond its capacity (a condition which will prevent the filter from properly cleaning itself)

Now, if the above-mentioned mill is to change to rolling finished pass metal, the degree of cleanliness must be brought up from a .08% total ash to a .002% total ash. This will require the filter to receive more filter aids and adsorbents per hour. For ease of understanding, it may be assumed that the mill requires 200 pounds of filter aids and adsorbents to continuously maintain the ash content of the coolant at .002% total ash. As the total capacity for holder filter aids and adsorbents for the subject filter is only 100 pounds, it must now clean iteslf twice per hour. My invention makes the control, as mentioned above, simple and automatic.

Referring to FIG. 6, it will be noted that a time switch L has been provided. This time switch is a device where a load circuit 69 is closed after a preset time. Time settings are adjusted by turning a dial pointer 70 to the time setting desired. If the dial pointer is set to 30 minutes, the control contacts 71 will close when a small motor 72 has operated for 30 minutes. This total of 30 minutes can be either continuous, or it can be a total of 30 minutes of interrupted time which would take more than 30 minutes of a standard clock time to complete. When the motor 72 has been energized for 30 minutes total time, the contacts 71 close and the time switch L returns to the starting point, ready for another 30 minutes of motor running with its contacts 71 open. In 30 minutes of run time, the above will be repeated.

The motor 72 of the time switch L gets its power through the contact of a percentage timer M. The motor 72 runs only when contacts 73 of the percentage timer are closed, and it does not run if the latter contacts are open.

A percentage timer, such as M, is a device where the repetitive "On" time of a fixed cycle can be varied by setting a dial pointer 74. The dial is calibrated in percent and is set for the percentage of time the contacts 73 are to be closed during one cycle. If, for example, the fixed cycle time is for a 30 seconds' duration, and the dial pointer 74 is set at 10%, the contacts 73 will be closed 3 seconds and open 27 seconds during the 30 second cycle The motor 75 of this percentage timer continues to operate at the above setting until the dial pointer 74 is turned to some other percent setting. The closed time of the contacts 73 then change to correspond to the new dial pointer setting. The percent setting change can be made while the device is operating.

The timer motor 72 runs only when the contacts 73 of the percentage timer M are closed. The motor 72 is stopped when the contacts 73 are open. When the total time that the motor 72 of the time switch L has run equal to the dial pointer setting, the time switch contacts 71 close, starting motor 76 of the motor-driven cam switch E. This in turn initiates the automatic cleaning of my liquid filtering device By thus changing the dial pointer 74 on the percentage timer M, a change can be made in the length of time my filter will operate before it automatically cleans itself.

Referring now to the body feed device J mentioned earlier, FIG. 6 shows that the solenoid feed valve 43 receives its electric power through the percentage timer contacts 73. The longer these percentage timer contacts are closed, the longer the body feed valve 43 is open, and more filter aids and adsorbents will flow into the pump 28 and be delivered to the inlet chambers 25 of the several containers B for forming the cakes K on the cake support mediums G.

If the percentage dial pointer 74 is set on 5%, the body feed valve 43 will be open for 5% of the fixed time cycle, say 30 seconds; then 5% of 30 seconds would hold this valve open for 1½ seconds each 30 seconds. Also, the motor of the time switch L will run 1½ seconds each 30 seconds. Now, if the dial pointer of the percentage timer M is changed to 10%, the body feed valve 43 will open for 3 seconds, allowing twice as much filter aids and adsorbents to enter the pump 28. Because the time switch motor 72 will also run for 3 seconds now, instead of 1½ seconds, as before, the total run time of the motor will be reached twice as soon as before, so the filtering containers B will receive twice the filter material per hour and will clean itself twice as often, so the coolant will get cleaner and the filter will not pack with cake beyond its ability to clean itself.

The above-mentioned arrangement of control is advantageous also for other processes besides the metal rolling industry. In batch filtration processes, the degree of dirt can be various and the degree of cleanliness requirements of the filtrate can also be various.

Most automatic filters get the signal to initiate their automatic cleaning cycle from some change in the inlet filter pressure, or a reduction of flow through the filter due to the clogging of the filter medium, or some change in the filter chamber itself, such as height of liquid in the chamber, or by using a time clock that signals the filter to go through a cleaning cycle at some predetermined time of the day.

The novel feature about my liquid filtering device is that it gets its signal to automatically go through a cleaning cycle from the time switch L, and a solenoid valve 43 receives its electric power through the percentage timer contacts 73. The longer these percentage contacts are closed, the longer the body feed valve 43 is open, and more filter aids and adsorbents will flow into the pump 28 and be delivered to the containers B. This feature is a tremendous improvement over the methods described above as the various methods used today, especially when filtering oils or other liquids where the total ash rating is the method required to determine the quality and usability liquid.

The quantity of filter aids and adsorbents injected into a filtering system having a fixed dirt load determines the ash rating of the filtered liquid. The more of these materials injected into a filtering system per hour or day, the lower the ash rating will be. Because of this fact, it is important to control the quantity of these materials injected into the filtering system so the ash content of the liquid being filtered can also be controlled. In the methods of control mentioned above as being used today by other filter manufacturers, in some cases the quantity of material injected into the filter system can be reduced or increased by speeding up or slowing down the slurry feeder, or body feeder. However, there is no coordination with this control, and the control of time between cleaning cycles.

Increasing the filter aid and adsorbent quantity injected into a filtering system does not necessarily create a change in the filter, such as a pressure increase or a flow reduction. Because of the above fact, when the slurry feeder injecting filter aids and adsorbents, or just filter aids, into a filtering system is speeded up for the purpose of increasing the quantity of filter aids injected to thus decrease the ash content of the liquid being filtered, the filter can be loaded up with filter aids above its ability to properly clean itself and in some cases, the filter can be severly damaged, because the filter has not received any signal directing it to clean itself, because more filter material is being injected and it will be full sooner.

With my control system, if the slurry feeder feeding rate is changed for the purpose of controlling or changing the ash content of the filtered liquid, the time between cleaning cycles automatically changes correrspondingly, this eliminating the danger of packing the filter to the extent of doing damage to it.

My control differs from all others used today, because it automatically controls the time between cleaning cycles in relationship to the amount of time in which filter aids and adsorbents are fed to the filtering system, and in no way does it respond to a condition of change in the filter, such as an increase in pressure, or a decrease in flow through the filter, or an increase in liquid level or heights in a chamber or tank, or a time clock. The signal that tells my filter to go through an automatic cleaning cycle is one from the time switch L, and the percentage timer M may be set to determine the amount of time in which filter aids and adsorbents will be delivered to the filter between cleaning cycles.

Referring now to FIG. 6 it will be noted that the motor 62 for driving the crown roll 59 is under control of a cam 77 and associated switch 77a. Moreover, the electric motor 28a that drives the pump 28 is under control of a cam 78 and associated switch 78a. Both of these cams form part of the motor-driven cam switch E.

In order to dry the cake K on the cake support medium G, air from the compressed air tank is delivered through a branch pipe 79 to the inlet chamber 25 of each separable liquid container B, this tank being indicated at 20 and previously mentioned. The branch pipe 79 has a solenoid valve 80 therein which is opened and closed under control of a cam 81 and associated switch 81a forming part of the motor-driven cam switch E.

With respect to the motor-driven cam switch E, it has a shaft 82 to which all of the cams previously mentioned are secured, whereby rotation of this shaft by the motor 76 will turn all of the cams simultaneously. It will be seen from FIG. 6 that each cam has a follower 83 that rides on the peripheral rim of the cam so as to actuate a movable contact arm 84, which operates the switches associated with the respective switches, i.e., the switches 23a, 30a, 44a, 77a and 78a.

All electrical power for the various circuits is derived from a source indicated at N in FIG. 6 of the drawings, and a main switch 85 has been shown for connecting the various circuits to this source of power.

I claim:
1. In a liquid filtering device:
  (a) a plurality of separable liquid containers arranged in bank formation, each having an inlet and an outlet chamber, the inlet chamber of each container communicating with the outlet chamber of an adjacent container;

(b) a pump connected to the inlet chamber of each container so as to deliver liquid thereto for being filtered;

(c) an automatically operated filter cake support medium feed device operable to move a porous cake support medium into a position between each adjacent pair of containers, when the latter are separated, so as to provide a porous cover over the outlet chamber of each container and through which the liquid must pass, when flowing from an inlet chamber to an outlet chamber;

(d) a body feed device including a feed valve in fluid communication with the pump and constructed and aranged to deliver aids to filtration and adsorbents to the liquid being pumped to the inlet chambers of the containers, whereby the aids to filtration and absorbents will be deposited on the cake support medium, a percentage timer connected to the feed valve and being calibrated in percent, and said timer being set for the percentage of time that the feed valve is to be open during one filtering cycle;

(e) a time switch having a motor that gets its power from the percentage timer when contacts of the latter are closed, this time switch being adjustable for a total operating time (continuous or interrupted), and control means connected to the time switch and operating when the total time that the motor has run is equal to the setting of the time switch to initiate an automatic cycle of operation which in turn automatically disposes of the removed foreign materials built up on the cake support medium and, also, replaces the dirty cake support medium with clean support medium for the next cycle the setting of the percentage timer controlling both the percentage of time that the feed valve is open during the filtering cycle and the percentage of time that the motor of the time switch runs during said cycle so that the total time period during which amounts of filter aid and absorbents are fed into the filtering system during a filtering cycle is equal to the setting of the time switch, since said setting of the time switch in turn determines the operation of the control means and the performance of the cleaning cycle of the filter device.

2. The liquid filtering device as set forth in claim 1;

(f) and in which the cake support medium forms a sheet extending from a roll, and automatically operated filter cake support medium feed device includes a crown roller over which the sheet extends and means for adjusting the axis of the roller for indexing this medium, while at the same time maintaining proper tracking of the cake support medium so that it will stay centered and not move over to one side or the other to the extent of becoming misaligned with confronting seal faces of the separated filter liquid containers.

3. The liquid filtering device, as set forth in claim 1;

(f) and in which an arrangement is provided for preventing the filter cake, made up of aids to filtration and foreign materials removed from the liquid by the filtration process, from falling out of the filter area between two separable liquid containers when the latter are separated, which would contaminate confronting seal faces of the liquid containers and make it impossible for them to seal properly when pressed back together again.

4. The liquid filtering device, as set forth in claim 1;

(f) and in which the containers are arranged at an incline relative to vertical, and means are provided to prevent the cake from sliding down to the bottom of the containers when the pressure due to the velocity of the liquid passing through the cake is removed.

5. The liquid filtering device, as set forth in claim 4;

(g) and in which the means provided to prevent the cake from sliding down to the bottom of the containers is defined by a step provided on each container at the bottom of the cake space.

6. The liquid filtering device, as set forth in claim 1;

(f) and in which an arrangement is provided for sealing confronting faces of adjacent separable containers to prevent leakage of the liquid to a position outside of these containers to the extent of dripping on the floor or the like;

(g) the arrangement provided for sealing the faces of adjacent separable containers against leakage defines inner and outer grooves that extend around the entire perimeter of the seal face of each container that confronts the seal face of an adjacent container;

(h) the inner groove communicating by a pipe with a tank under atmospheric pressure;

(i) and the outer groove communicating with a source of air under pressure greater than atmospheric, so that air will leak from the outer groove to the inner groove through the edge of the cake support medium and will go to said tank with any liquid that has been leaked from the inside of the filter container into the inner groove.

7. The liquid filtering device, as set forth in claim 1;

(f) and in which a safety arrangement is provided to prevent the filter pump from starting up, causing excessive leakage, if confronting faces of the separable liquid containers are not properly sealed.

8. The liquid filtering device, as set forth in claim 1;

(f) and in which said control means defines:
  (1) a motor-driven cam switch having a motor that is connected to the timer switch so that when the total time that the motor of the timer switch has run equals the setting of the latter, the motor of the cam switch is started;
  (2) the motor-driven cam switch having a plurality of cams and associated switches for controlling the opening and closing of the liquid containers relative to one another, the flow of liquid from the pump to the liquid containers, the operation of the feed valve during the cleaning operation by removing power from this valve, the cake support medium feed device, and the pump for delivering the liquids to the containers.

9. The liquid filtering device, as set forth in claim 8;

(g) and in which means are provided for delivering compressed air to the inlet chambers of the separable liquid containers to dry the filter cake therein, and this means being controlled by the motor-driven cam switch.

References Cited
UNITED STATES PATENTS

| | | | |
|---|---|---|---|
| 2,790,553 | 4/1957 | Bange | 210—138 |
| 2,971,648 | 2/1961 | Lane et al. | 210—75 |
| 2,993,559 | 7/1961 | Moon et al. | 210—75 |
| 3,038,611 | 6/1962 | O'Conor et al. | 210—138 |
| 3,121,681 | 2/1964 | Baxter | 210—143 X |
| 3,270,887 | 9/1966 | Juhasz et al. | 210—225 |
| 3,289,844 | 12/1966 | Emele | 210—225 |
| 3,342,123 | 9/1967 | Ermakov et al. | 210—255 X |
| 3,349,913 | 10/1967 | Schneider | 210—138 X |
| 3,360,130 | 12/1967 | Kaga | 210—225 |

REUBEN FRIEDMAN, Primary Examiner

W. S. BRADBURY, Assistant Examiner

U.S. Cl. X.R.

210—251, 193, 143, 225, 229, 387